United States Patent
Kroghahl et al.

(10) Patent No.: US 9,459,661 B2
(45) Date of Patent: Oct. 4, 2016

(54) CAMOUFLAGED OPENINGS IN ELECTRONIC DEVICE HOUSINGS

(71) Applicant: Apple Inc., Cupertino, CA (US)

(72) Inventors: James R. Kroghahl, Cupertino, CA (US); Nathan N. Ng, Fremont, CA (US); Rimple Bhatia, Woodside, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 13/921,983

(22) Filed: Jun. 19, 2013

(65) Prior Publication Data
US 2014/0376234 A1 Dec. 25, 2014

(51) Int. Cl.
*G03B 15/06* (2006.01)
*G06F 1/16* (2006.01)
*H04M 1/02* (2006.01)

(52) U.S. Cl.
CPC .......... *G06F 1/1656* (2013.01); *H04M 1/026* (2013.01); *G06F 1/1626* (2013.01)

(58) Field of Classification Search
CPC ........ B65D 7/36; B65D 1/165; B65D 1/265; B65D 1/40; B65D 1/38; B65D 2543/00296; B29C 49/04; H04M 1/22; H04M 1/026; H04M 1/0264; H04M 1/0266; H04M 1/0268
USPC ............ 174/50, 17.05, 50.51, 559; 220/675, 220/676, 669, 662
See application file for complete search history.

(56) References Cited

U.S. PATENT DOCUMENTS

| | | |
|---|---|---|
| 2,643,020 A | 6/1953 | Dalton |
| 3,626,723 A | 4/1968 | Emile |
| 3,415,637 A | 12/1968 | Glynn |
| 3,441,398 A | 4/1969 | Hess |
| 3,467,508 A | 9/1969 | Loukes et al. |
| 3,498,773 A | 3/1970 | Due et al. |
| 3,558,415 A | 1/1971 | Rieser et al. |
| 3,607,172 A | 9/1971 | Poole et al. |
| 3,619,240 A | 11/1971 | Toussaint et al. |
| 3,652,244 A | 3/1972 | Plumat |
| 3,753,840 A | 8/1973 | Plumat |
| 3,798,013 A | 3/1974 | Inoue et al. |
| 3,843,472 A | 10/1974 | Toussaint et al. |

(Continued)

FOREIGN PATENT DOCUMENTS

| | | |
|---|---|---|
| AT | 283 630 B | 10/1970 |
| CN | 1277090 A | 12/2000 |

(Continued)

OTHER PUBLICATIONS

Kingery et al., "Introduction to Ceramics" 2nd Ed. John Wiley & Sons, 1976, pp. 792 and 833-844.

(Continued)

*Primary Examiner* — Anabel Ton

(57) ABSTRACT

Techniques and apparatus for providing one or more holes in a housing for an electronic device are disclosed. The one or more holes in the housing can be used to facilitate visual indicators. A light source can be controlled to provide light into a hole and thus emit light from the hole. When the light source is not providing light to the hole, the hole can be visually disguised (e.g., camouflaged) so it blends with the surrounding portions of the housing. The electronic device can, for example, be a small electronic device, such as a portable or handheld electronic device.

24 Claims, 8 Drawing Sheets

(56) References Cited

U.S. PATENT DOCUMENTS

| | | | |
|---|---|---|---|
| 3,857,689 A | 12/1974 | Koizumi et al. | |
| 3,926,605 A | 12/1975 | Kunkle | |
| 3,951,707 A | 4/1976 | Kurtz et al. | |
| 4,015,045 A | 3/1977 | Rinehart | |
| 4,052,184 A | 10/1977 | Anderson | |
| 4,119,760 A | 10/1978 | Rinehart | |
| 4,156,755 A | 5/1979 | Rinehart | |
| 4,165,228 A | 8/1979 | Ebata et al. | |
| 4,178,082 A | 12/1979 | Ganswein et al. | |
| 4,212,919 A | 7/1980 | Hoda | |
| 4,218,230 A | 8/1980 | Hogan | |
| 4,346,601 A | 8/1982 | France | |
| 4,353,649 A | 10/1982 | Kishii | |
| 4,425,810 A | 1/1984 | Simon et al. | |
| 4,537,820 A | 8/1985 | Nowobliski et al. | |
| 4,646,722 A | 3/1987 | Silverstein et al. | |
| 4,733,973 A | 3/1988 | Machak et al. | |
| 4,842,629 A | 6/1989 | Clemens et al. | |
| 4,844,724 A | 7/1989 | Sakai et al. | |
| 4,846,868 A | 7/1989 | Aratani | |
| 4,849,002 A | 7/1989 | Rapp | |
| 4,872,896 A | 10/1989 | LaCourse et al. | |
| 4,911,743 A | 3/1990 | Bagby | |
| 4,937,129 A | 6/1990 | Yamazaki | |
| 4,957,364 A | 9/1990 | Chesler | |
| 4,959,548 A | 9/1990 | Kupperman et al. | |
| 4,983,197 A | 1/1991 | Froning et al. | |
| 4,986,130 A | 1/1991 | Engelhaupt et al. | |
| 5,041,173 A | 8/1991 | Shikata et al. | |
| 5,104,435 A | 4/1992 | Oikawa et al. | |
| 5,129,934 A | 7/1992 | Koss | |
| 5,157,746 A | 10/1992 | Tobita et al. | |
| 5,160,523 A | 11/1992 | Honkanen et al. | |
| 5,254,149 A | 10/1993 | Hashemi et al. | |
| 5,269,888 A | 12/1993 | Morasca | |
| 5,281,303 A | 1/1994 | Beguin et al. | |
| 5,369,267 A | 11/1994 | Johnson et al. | |
| 5,411,563 A | 5/1995 | Yeh | |
| 5,437,193 A | 8/1995 | Schleitweiler et al. | |
| 5,445,871 A | 8/1995 | Murase et al. | |
| 5,483,261 A | 1/1996 | Yasutake | |
| 5,488,204 A | 1/1996 | Mead et al. | |
| 5,525,138 A | 6/1996 | Hashemi et al. | |
| 5,625,154 A | 4/1997 | Matsuhiro et al. | |
| 5,654,057 A | 8/1997 | Kitayama | |
| 5,725,625 A | 3/1998 | Kitayama et al. | |
| 5,733,622 A | 3/1998 | Starcke et al. | |
| 5,766,493 A | 6/1998 | Shin | |
| 5,780,371 A | 7/1998 | Rifqi et al. | |
| 5,816,225 A | 10/1998 | Koch et al. | |
| 5,825,352 A | 10/1998 | Bisset et al. | |
| 5,826,601 A | 10/1998 | Muraoka et al. | |
| 5,835,079 A | 11/1998 | Shieh | |
| 5,880,411 A | 3/1999 | Gillespie et al. | |
| 5,930,047 A | 7/1999 | Gunz et al. | |
| 5,953,094 A | 9/1999 | Matsuoka et al. | |
| 5,985,014 A | 11/1999 | Ueda et al. | |
| 6,050,870 A | 4/2000 | Suginoya et al. | |
| 6,114,039 A | 9/2000 | Rifqui | |
| 6,120,908 A | 9/2000 | Papanu et al. | |
| 6,166,915 A | 12/2000 | Lake et al. | |
| 6,188,391 B1 | 2/2001 | Seely et al. | |
| 6,245,313 B1 | 6/2001 | Suzuki et al. | |
| 6,287,674 B1 | 9/2001 | Verlinden et al. | |
| 6,307,590 B1 | 10/2001 | Yoshida | |
| 6,310,610 B1 | 10/2001 | Beaton et al. | |
| 6,323,846 B1 | 11/2001 | Westerman et al. | |
| 6,325,704 B1 | 12/2001 | Brown et al. | |
| 6,327,011 B2 | 12/2001 | Kim | |
| 6,350,664 B1 | 2/2002 | Haji et al. | |
| 6,393,180 B1 | 5/2002 | Farries et al. | |
| 6,429,840 B1 | 8/2002 | Sekiguchi | |
| 6,437,867 B2 | 8/2002 | Zeylikovich et al. | |
| 6,516,634 B1 | 2/2003 | Green et al. | |
| 6,521,862 B1 | 2/2003 | Brannon | |
| 6,621,542 B1 | 9/2003 | Aruga | |
| 6,690,387 B2 | 2/2004 | Zimmerman et al. | |
| 6,718,612 B2 | 4/2004 | Bajorek | |
| 6,769,274 B2 | 8/2004 | Cho et al. | |
| 6,772,610 B1 | 8/2004 | Albrand et al. | |
| 6,810,688 B1 | 11/2004 | Duisit et al. | |
| 6,936,741 B2 | 8/2005 | Munnig et al. | |
| 6,955,971 B2 | 10/2005 | Ghyselen et al. | |
| 6,996,324 B2 | 2/2006 | Hiraka et al. | |
| 7,012,700 B2 | 3/2006 | De Groot et al. | |
| 7,013,709 B2 | 3/2006 | Hajduk et al. | |
| 7,015,894 B2 | 3/2006 | Morohoshi | |
| 7,070,837 B2 | 7/2006 | Ross | |
| 7,166,531 B1 | 1/2007 | van Den Hoek et al. | |
| 7,184,064 B2 | 2/2007 | Zimmerman et al. | |
| 7,461,564 B2 | 12/2008 | Glaesemann | |
| 7,558,054 B1 | 7/2009 | Prest et al. | |
| 7,626,807 B2 | 12/2009 | Hsu | |
| 7,663,607 B2 | 2/2010 | Hotelling et al. | |
| 7,719,835 B1* | 5/2010 | Schluter | 361/695 |
| 7,810,355 B2 | 10/2010 | Feinstein et al. | |
| 7,872,644 B2 | 1/2011 | Hong et al. | |
| 7,918,019 B2 | 4/2011 | Chang et al. | |
| 8,013,834 B2 | 9/2011 | Kim | |
| 8,110,268 B2 | 2/2012 | Hegemier et al. | |
| 8,111,248 B2 | 2/2012 | Lee et al. | |
| 8,312,743 B2 | 11/2012 | Pun et al. | |
| 8,393,175 B2 | 3/2013 | Kohli et al. | |
| 8,551,283 B2 | 10/2013 | Pakula et al. | |
| 8,616,661 B2* | 12/2013 | Takata et al. | 312/140 |
| 8,673,163 B2 | 3/2014 | Zhong | |
| 8,684,613 B2 | 4/2014 | Weber et al. | |
| 8,779,287 B2* | 7/2014 | Lin et al. | 174/59 |
| 8,824,140 B2 | 9/2014 | Prest | |
| 2002/0035853 A1 | 3/2002 | Brown et al. | |
| 2002/0105793 A1* | 8/2002 | Oda | G02B 5/045 362/620 |
| 2002/0155302 A1 | 10/2002 | Smith et al. | |
| 2002/0157199 A1 | 10/2002 | Piltingsrud | |
| 2003/0024274 A1 | 2/2003 | Cho et al. | |
| 2003/0057183 A1 | 3/2003 | Cho et al. | |
| 2003/0077453 A1 | 4/2003 | Oaku et al. | |
| 2003/0234771 A1 | 12/2003 | Mulligan et al. | |
| 2004/0051944 A1 | 3/2004 | Stark | |
| 2004/0119701 A1 | 6/2004 | Mulligan et al. | |
| 2004/0137828 A1 | 7/2004 | Takashashi et al. | |
| 2004/0142118 A1 | 7/2004 | Takechi | |
| 2004/0163414 A1 | 8/2004 | Eto et al. | |
| 2005/0058423 A1 | 3/2005 | Brinkmann et al. | |
| 2005/0105071 A1 | 5/2005 | Ishii | |
| 2005/0135724 A1 | 6/2005 | Helvajian et al. | |
| 2005/0193772 A1 | 9/2005 | Davidson et al. | |
| 2005/0245165 A1 | 11/2005 | Harada et al. | |
| 2005/0259438 A1* | 11/2005 | Mizutani | G02B 6/0013 362/612 |
| 2005/0285991 A1 | 12/2005 | Yamazaki | |
| 2006/0026521 A1 | 2/2006 | Hotelling et al. | |
| 2006/0054335 A1* | 3/2006 | Rapp et al. | 174/48 |
| 2006/0055936 A1 | 3/2006 | Yun et al. | |
| 2006/0063351 A1 | 3/2006 | Jain | |
| 2006/0070694 A1 | 4/2006 | Rehfeld et al. | |
| 2006/0097991 A1 | 5/2006 | Hotelling et al. | |
| 2006/0197753 A1 | 9/2006 | Hotelling et al. | |
| 2006/0227331 A1 | 10/2006 | Wollmer et al. | |
| 2006/0238695 A1 | 10/2006 | Miyamoto | |
| 2006/0250559 A1 | 11/2006 | Bocko et al. | |
| 2006/0268528 A1 | 11/2006 | Zadesky et al. | |
| 2006/0292822 A1 | 12/2006 | Xie | |
| 2007/0003796 A1 | 1/2007 | Isono et al. | |
| 2007/0013822 A1 | 1/2007 | Kawata et al. | |
| 2007/0029519 A1 | 2/2007 | Kikuyama et al. | |
| 2007/0030436 A1 | 2/2007 | Sasabayashi | |
| 2007/0039353 A1 | 2/2007 | Kamiya | |
| 2007/0046200 A1 | 3/2007 | Fu et al. | |
| 2007/0063876 A1 | 3/2007 | Wong | |
| 2007/0089827 A1 | 4/2007 | Funatsu | |
| 2007/0122542 A1 | 5/2007 | Halsey et al. | |
| 2007/0132737 A1 | 6/2007 | Mulligan et al. | |
| 2007/0196578 A1 | 8/2007 | Karp et al. | |

(56) References Cited

U.S. PATENT DOCUMENTS

| | | |
|---|---|---|
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135175 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1 | 2/2009 | Bolton |
| 2009/0067141 A1 | 3/2009 | Dabov et al. |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0257189 A1 | 10/2009 | Wang et al. |
| 2009/0294420 A1 | 12/2009 | Abramov et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0028607 A1 | 2/2010 | Lee et al. |
| 2010/0035038 A1 | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hashimoto et al. |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Mathew et al. |
| 2010/0321305 A1 | 12/2010 | Chang et al. |
| 2011/0003619 A1 | 1/2011 | Fujii |
| 2011/0012873 A1 | 1/2011 | Prest et al. |
| 2011/0019123 A1 | 1/2011 | Prest et al. |
| 2011/0019354 A1 | 1/2011 | Prest et al. |
| 2011/0030209 A1 | 2/2011 | Chang et al. |
| 2011/0063550 A1 | 3/2011 | Gettemy et al. |
| 2011/0067447 A1 | 3/2011 | Prest et al. |
| 2011/0072856 A1 | 3/2011 | Davidson et al. |
| 2011/0102346 A1 | 5/2011 | Orsley et al. |
| 2011/0159321 A1 | 6/2011 | Eda et al. |
| 2011/0164372 A1 | 7/2011 | McClure et al. |
| 2011/0182084 A1* | 7/2011 | Tomlinson ............ G02B 6/0036 362/608 |
| 2011/0186345 A1 | 8/2011 | Pakula et al. |
| 2011/0188846 A1* | 8/2011 | Sorg .................... F21V 33/0052 396/200 |
| 2011/0199687 A1 | 8/2011 | Sellier et al. |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0027399 A1 | 2/2012 | Yeates |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1 | 5/2012 | Glaesemann et al. |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1 | 8/2012 | Cornejo et al. |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright et al. |
| 2013/0182259 A1 | 7/2013 | Brezinski et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 1369449 A | 9/2002 |
| CN | 1694589 A | 11/2005 |
| CN | 101025502 | 8/2007 |
| CN | 101206314 | 6/2008 |
| CN | 101523275 | 2/2009 |
| CN | 101465892 | 6/2009 |
| CN | 102131357 | 7/2011 |
| CN | 101267509 | 8/2011 |
| CN | 1322339 | 11/2011 |
| DE | 14 96 586 A1 | 6/1969 |
| DE | 17 71 268 A1 | 12/1971 |
| DE | 32 12 612 A1 | 10/1983 |
| DE | 103 22 350 A1 | 12/2004 |
| EP | 1038663 A2 | 9/2000 |
| EP | 1 206 422 B1 | 11/2002 |
| EP | 1 593 658 A1 | 11/2005 |
| EP | 1592073 | 11/2005 |
| EP | 2025556 A2 | 2/2009 |
| EP | 2036867 A1 | 3/2009 |
| EP | 2075237 | 7/2009 |
| EP | 2196870 A1 | 6/2010 |
| EP | 2233447 | 9/2010 |
| EP | 2483216 | 8/2012 |
| EP | 2635540 | 9/2013 |
| FR | 2 797 627 A1 | 2/2001 |
| FR | 2 801 302 A1 | 5/2001 |
| GB | 1 346 747 | 2/1974 |
| JP | B S42-011599 | 6/1963 |
| JP | B-S48-006925 | 3/1973 |
| JP | 55031944 | 3/1980 |
| JP | 55 067529 | 5/1980 |
| JP | 55-95645 | 7/1980 |
| JP | A S55-136979 | 10/1980 |
| JP | 55 144450 | 11/1980 |
| JP | A S59-013638 | 1/1984 |
| JP | 59037451 | 2/1984 |
| JP | A S61-097147 | 5/1986 |
| JP | 6066696 | 10/1986 |
| JP | 63 060129 | 3/1988 |
| JP | 63222234 | 9/1988 |
| JP | 5-32431 | 2/1993 |
| JP | 05249422 | 9/1993 |
| JP | 6242260 A | 9/1994 |
| JP | A H07-050144 | 2/1995 |
| JP | 52031757 | 3/1997 |
| JP | A-H09-073072 | 3/1997 |
| JP | A H09-507206 | 7/1997 |
| JP | 09-312245 | 12/1997 |
| JP | A 2000-086261 | 3/2000 |
| JP | 2000-163031 | 6/2000 |
| JP | 200203895 A | 7/2000 |
| JP | 2001-083887 | 3/2001 |
| JP | A 2002-160932 | 6/2002 |
| JP | 2002-342033 | 11/2002 |
| JP | A 2002-338283 | 11/2002 |
| JP | A2003502257 | 1/2003 |
| JP | A2003-146705 | 5/2003 |
| JP | 2004-094256 | 3/2004 |
| JP | A2004-259402 | 9/2004 |
| JP | A2004-339019 | 12/2004 |
| JP | 2005-162549 | 6/2005 |

(56) References Cited

FOREIGN PATENT DOCUMENTS

| | | |
|---|---|---|
| JP | A 2005-156766 | 6/2005 |
| JP | A 2005140901 | 6/2005 |
| JP | 2007-099557 | 4/2007 |
| JP | 2008-001590 | 1/2008 |
| JP | 2008007360 | 1/2008 |
| JP | 2008-63166 A | 3/2008 |
| JP | 2008-066126 A | 3/2008 |
| JP | 2008-192194 | 8/2008 |
| JP | A 2008-195602 | 8/2008 |
| JP | A2008-216938 | 9/2008 |
| JP | A2008-306149 | 12/2008 |
| JP | A 2009-167086 | 7/2009 |
| JP | A 2009-234856 | 10/2009 |
| JP | A2009230341 | 10/2009 |
| JP | 2010-060908 | 3/2010 |
| JP | 2010 064943 | 3/2010 |
| JP | A 2010-116276 | 5/2010 |
| JP | 2010/195600 | 9/2010 |
| JP | 2010-237493 | 10/2010 |
| JP | 2011-032124 | 2/2011 |
| JP | 2011-158799 | 8/2011 |
| JP | 2011-527661 | 11/2011 |
| JP | A 2011-231009 | 11/2011 |
| JP | A 2013-537723 | 10/2013 |
| KR | 2010-2006-005920 | 1/2006 |
| KR | 10-2010-0019526 | 2/2010 |
| KR | 10-2011-0030919 | 3/2011 |
| TW | 201007521 A | 2/2010 |
| TW | 201235744 A1 | 9/2012 |
| WO | WO 00/47529 A | 8/2000 |
| WO | WO 02/42838 A1 | 5/2002 |
| WO | WO 2004/014109 | 2/2004 |
| WO | WO 2004-061806 | 7/2004 |
| WO | WO 2004/106253 A | 12/2004 |
| WO | WO 2007/089054 A1 | 8/2007 |
| WO | WO 2008/044694 A | 4/2008 |
| WO | WO 2008/143999 A1 | 11/2008 |
| WO | WO 2009/003029 | 12/2008 |
| WO | WO 2009/078406 | 6/2009 |
| WO | WO 2009/099615 | 8/2009 |
| WO | WO 2009/102326 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO 2010/080988 | 7/2010 |
| WO | WO 2010/101961 | 9/2010 |
| WO | WO 2011/008433 | 1/2011 |
| WO | WO 2011/041484 A1 | 4/2011 |
| WO | WO 2012/015960 | 2/2012 |
| WO | WO 2012/106280 | 8/2012 |
| WO | WO 2013/106242 A2 | 7/2013 |

OTHER PUBLICATIONS

Karlsson et al., "The Technology of Chemical Glass Strengthening-a review", Apr. 2010, Glass Technology, European Journal of Glass Science and Technology A., vol. 51, No. 2, pp., 41-54.

Ohkuma, "Development of a Manufacturing Process of a Thin, Lightweight LCD Cell", Department of Cell Process Development, IBM, Japan, Section 13.4.

Lee et al., "A Multi-Touch Three Dimensional Touch-Sensitive Tablet", Proceedings of CHI: ACM Conference on Human Factors in Computing Systems, Apr. 1985, pp. 21-25.

Rubine, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.

Rubine, "Combining Gestures and Direct Manipulation", CHI'92, May 1992, pp. 659-660.

Westerman, "Hand Tracking, Finger Identification and Chrodic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.

Aben "Laboratory of Photoelasticity", Institute of Cybernetics at TTU, www.ioc.ee/res/photo.html, Oct. 5, 2000.

Forooghian et al., Investigative Ophthalmology & Visual Science; Oct. 2008, vol. 49, No. 10.

Arun K. Varshneya, Chemical Strengthening of Glass: Lessons Learned and Yet to be Learned International Journal of Applied Glass Science, 2010, 1, 2, pp. 131-142.

Chemically Strengthened Glass, Wikipedia, Apr. 19, 2009, http://en/wikipedia.org/w/index.php?title=Chemically_strengthened_glass&oldid=28 4794988.

Wikipedia: "Iphone 4", www.wikipedia.org, retrieved Oct. 31, 2011, 15 pgs.

"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.

* cited by examiner

CAMOUFLAGED OPENINGS IN ELECTRONIC DEVICE HOUSINGS

BACKGROUND

Conventionally, a portable electronic device has a housing that encases various electrical components of the portable electronic device. Often, the portable electronic device has one or more indicator lights. For example, the housing can include a small hole through which light can be expelled when an indicator light is to be provided. The indicator lights can be used for various purposes, such as for a status indication or an alert to be provided to a user of the portable electronic device. Examples of common indicator lights include a battery charging indicator light, a power-on indicator light, etc. Unfortunately, however, the holes in the housing for the indicator lights are visible and cosmetically unappealing when the indicator lights are not use.

SUMMARY

Techniques and apparatus for providing one or more holes in a housing for an electronic device. The one or more holes in the housing can be used to facilitate visual indicators. A light source can be controlled to provide light into a hole and thus emit light from the hole. When the light source is not providing light to the hole, the hole can be visually disguised (e.g., camouflaged) so it blends with the surrounding portions of the housing. The electronic device can, for example, be a small electronic device, such as a portable or handheld electronic device.

Embodiments of the invention can be implemented in numerous ways, including as a method, system, device, or apparatus. Several embodiments of the invention are discussed below.

As an electronic device, one embodiment can, for example, include at least: a housing having an outer exposed surface with at least one hole extending therethrough, the housing at least partially covering an inner region; a light source provided within the inner region and proximate to the at least one hole; a light transmissive filler provided in the hole; and light reflective material selectively provided in or on the light transmissive filler.

As a method for camouflaging an indicator hole in an outer housing for an electronic device, one embodiment can, for example, include at least: filling at least a portion of the indicator hole with a transparent material to seal the indicator hole; and selectively providing light reflective material in or on the transparent material provided in the indicator hole.

As a consumer electronic device, one embodiment can, for example, include at least: a housing having an outer exposed surface with at least one hole extending therethrough, the housing at least partially covering an inner region; a light source provided within the inner region and proximate to the at least one hole; a controller provided within the inner region and operatively coupled to the light source to control when the light source emits light; a polymer filler provided in the hole; and ink selectively provided in or on the polymer filler.

Other aspects and advantages of embodiment of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Techniques and apparatus for providing one or more holes in a housing for an electronic device. The one or more holes in the housing can be used to facilitate visual indicators. A light source can be controlled to provide light into a hole and thus emit light from the hole. When the light source is not providing light to the hole, the hole can be visually disguised (e.g., camouflaged) so it blends with the surrounding portions of the housing. The electronic device can, for example, be a small electronic device, such as a portable or handheld electronic device.

The techniques and methods can be used for electronic devices which have a housing that contains one or more electrical components. These electronic devices can also be referred to as consumer electronic devices since they are for user by a consumer. In any event, the electronic devices are relatively small electronic devices, such as electronic devices which have a relatively small form factor (e.g., portable digital media players, mobile telephones (smart phones), remote controllers, connectors, adapters (power adapters)), or electronic devices which have a relatively larger form factor (e.g., portable computers, tablet computers, displays, monitors, televisions, etc.).

Embodiments are discussed below with reference to FIGS. 1-7. However, those skilled in the art will readily appreciate that the detailed description given herein with respect to these figures is for explanatory purposes as the invention extends beyond these limited embodiments.

The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings have been exaggerated for ease of illustration.

Figure 1:
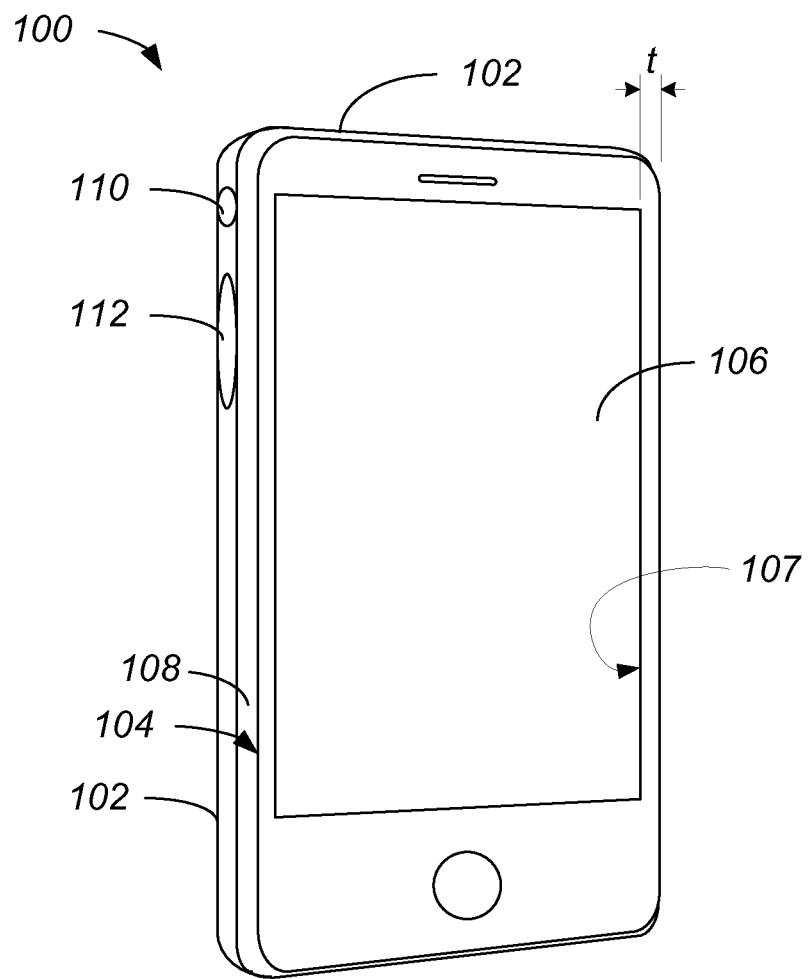
FIG. 1 is a perspective diagram of a handheld electronic device according to one embodiment.

FIG. 1 is a perspective diagram of a handheld electronic device 100 according to one embodiment. The handheld electronic device 100 may include a housing 102 that is arranged to at least partially surround the periphery of the handheld electronic device 100 to form some or all of the outer-most side, top and bottom surfaces of the handheld electronic device 100. The handheld electronic device 100 also includes a cover piece 104 that is arranged to be substantially coupled to housing 102 to effectively enclose an inner volume of the handheld electronic device 100. The cover piece 104 may include a glass member 106, e.g., cover glass, provided over a display of the handheld electronic device 100. In one embodiment, the cover piece 104 can include a protective frame 108 in which glass member 106 is held. The glass member 106 can serve as the top surface of the housing 102. A display region 107 of the glass member 106 is that portion of the glass member 106 that corresponds to the display (e.g., active display region).

The housing 102 may have any suitable shape, including, for example, one or more elements that may be combined to form a rectangular structure. The housing 102 may at least partially enclose an inner volume in which electronic device components, including a light source, may be assembled and retained. The shape of housing 102 may substantially define boundaries of the inner volume, and may be determined based upon the size and type of components placed within the inner volume.

The housing 102 may have any suitable size, and the size may be determined based on any suitable criteria. Suitable criteria may include, but are not limited to including, aesthetics or industrial design, structural considerations, components required for a desired functionality, and/or product design. The housing 102 may have any suitable cross-section, including for example a variable cross-section or a constant cross-section. In some embodiments, the cross-section may be selected based on desired structural properties for housing 102. For example, the cross-section of housing 102 may be substantially rectangular, such that the height of housing 102 is substantially larger than the width of housing 102. Such a cross-sectional shape may provide structural stiffness in compression and tension, as well as in bending. In some embodiments, the dimensions of housing 102 cross-section may be determined relative to the dimensions of the components contained by housing 102.

In some embodiments, housing 102 may include features 110, 112. The features 110, 112 may generally include one or more openings, knobs, extensions, flanges, chamfers, or other features for receiving components or elements of the device. The features 110, 112 of the housing 102 extend from any surface of housing 102, including for example from internal surfaces (e.g., to retain internal components or component layers) or from external surfaces. In particular, the housing 102 may include a slot or opening (not shown) for receiving a card or tray within the handheld electronic device 100. The housing 102 may also include a connector opening (not shown), e.g., for a 30-pin connector, through which a connector may engage one or more conductive pins of the handheld electronic device 100. Other features 110, 112 included on the housing 102 may include, but are not limited to, an opening for providing audio to a user, an opening for receiving audio from a user, an opening for a connector (e.g., audio connector or power supply connector), and/or features for retaining and enabling a button such as a volume control or silencing switch.

The housing 102 also include an indicator hole 714. In this embodiment, the indicator hole 714 is provided at a side of the housing 102. However, in other embodiment, the indicator hole could be placed at any portion of the housing 102. The indicator hole 714 is used to provide a visual indicator to a user of the handheld electronic device 100 (or other person). The visual indicator can indicate a status or alert. For example, the visual indicator can indicate battery charging, powered-on, accessing memory, transmitting data, electrical connection, etc. Alternatively, the visual indicator can provide a cosmetic effect for the housing 102.

Figure 2A:
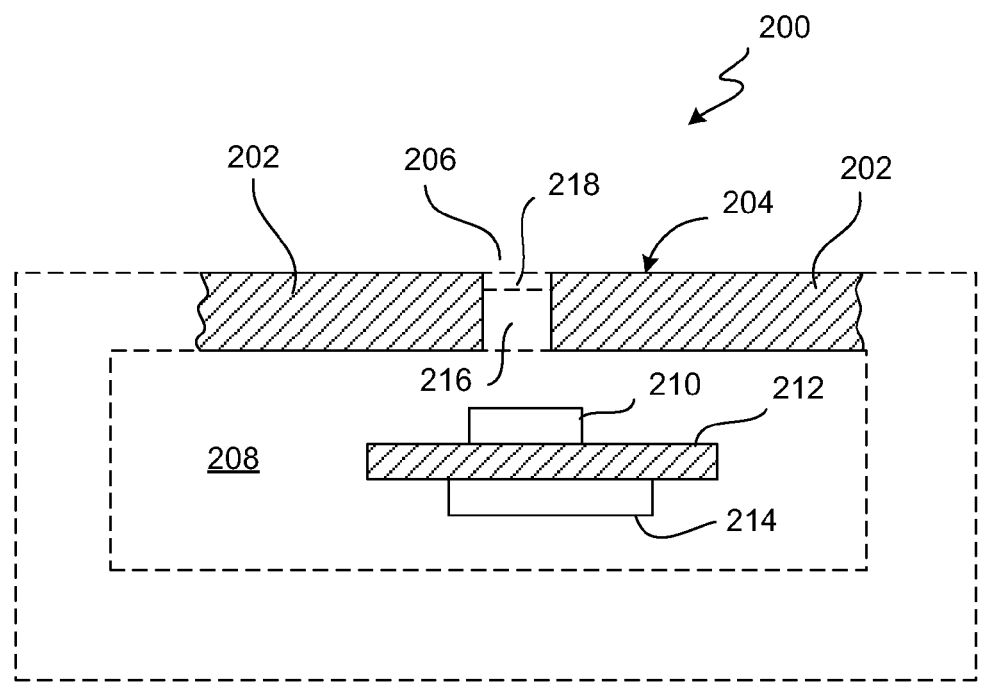
FIG. 2A is a cross-sectional diagram of a portion of an electronic device according to one embodiment.

FIG. 2A is a cross-sectional diagram of a portion of an electronic device 200 according to one embodiment. The electronic device 200 includes a housing member 202 that represents a portion of a housing for the electronic device 200 and provides an outer exposed surface 204. The outer exposed surface 204 of the housing for the electronic device 200 is visible to a user of the electronic device. The housing member 202 includes a hole 206 that extends through the width of the housing member 202.

In addition, the housing for the electronic device 200 includes an inner region 208 where one or more electrical components can be provided to support the functionality of the electronic device. In this embodiment, a light source 210 can be provided within the inner region 208. The light source 210 can be mounted on a substrate 212. The light source 210 can, for example, be implemented as a light emitting diode (LED). The substrate 212 can be implemented as a printed circuit board. Further still, to control the light source 210, a controller 214 can also be mounted on the substrate 212 and electrically coupled to the light source 210.

During operation of the electronic device, the controller 214 can control when the light source 210 is to produce light that will pass through the hole 206 in the housing member 202 so that a visible light indication is provided at the outer exposed surface 204 of the housing member 202. Additionally, the hole 206 in the housing member 202 can be partially or completely filled with a light transmissive filler 216. The light transmissive filler 216 is substantially transparent to light so that the light produced by the light source 210 can pass through the light transmissive filler 216. The light transmissive filler 216 serves to seal the hole 206 so that unwanted dirt, dust, or other debris can not enter or clog the hole 206.

Further still, a light reflective material 218 is provided on or in the light transmissive filler 216. The light reflective material 218 is provided in a manner such that it does not dramatically impede the light produced by the light source 210, yet is able to provide reflection of external light that impinges on the light reflective material 218. As a result, the light reflective material 218 allows the hole 206 in the housing member 202 to be disguised or camouflaged while the light indication is not being provided.

Figure 2B:
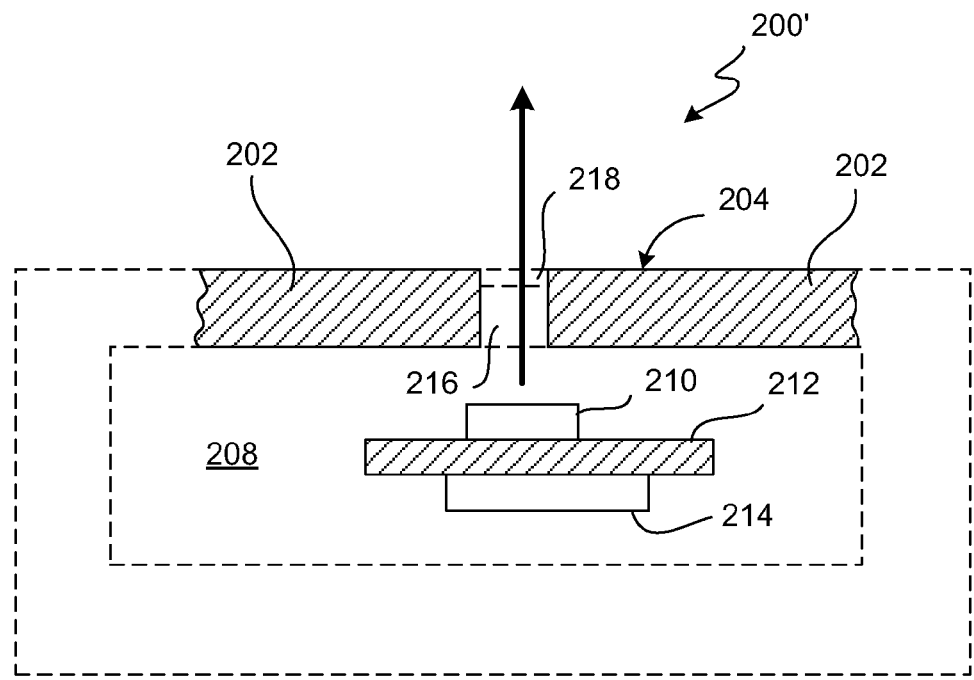
FIG. 2B is a cross-sectional diagram of a portion of an electronic device according to one embodiment.

FIG. 2B is a cross-sectional diagram of a portion of an electronic device 200' according to one embodiment. The electronic device 200' illustrated in FIG. 2B is the same structure as the electronic device 200 illustrated in FIG. 2A. Specifically, the electronic device 200' depicted in FIG. 2B illustrates an illuminated state in which light 220 produced by the light source 210 is projected through the hole 206. The light 220 transmits through the light transmissive filler 216 without being blocked by the light reflective material 218. While some of the light generated by the light source 210 could be blocked by the light reflective material 218, a substantial portion of the generated light does project out from the hole 206 in the housing for the electronic device 200'.

Figure 2C:
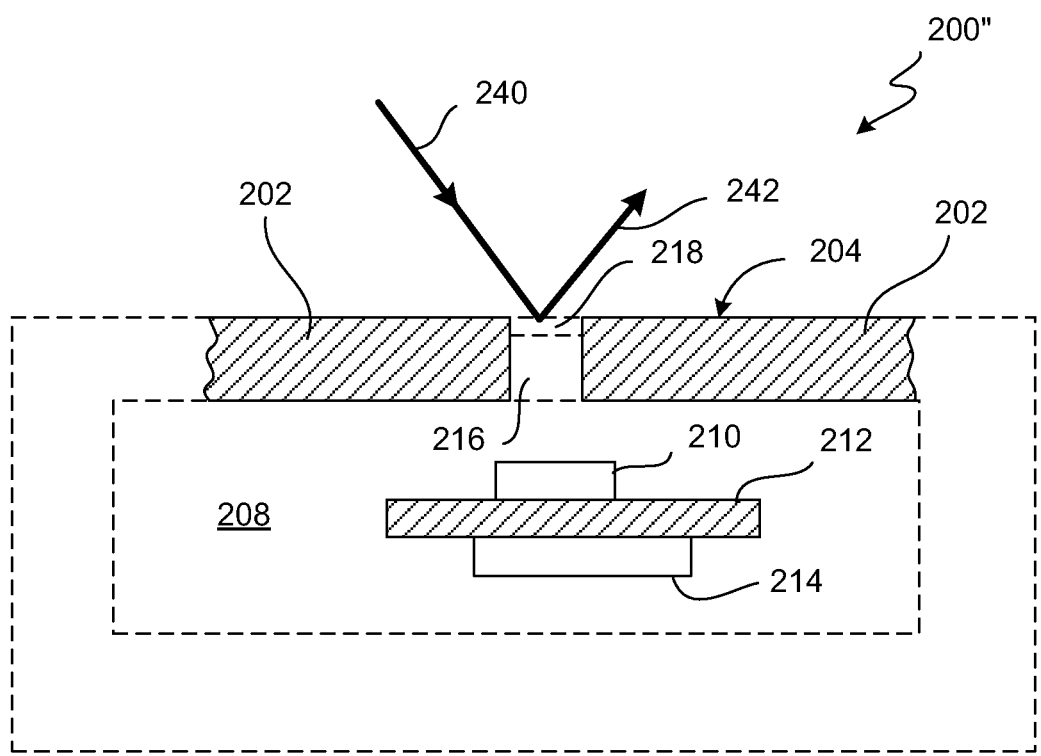
FIG. 2C is a cross-sectional diagram of a portion of an electronic device according to one embodiment.

FIG. 2C is a cross-sectional diagram of a portion of an electronic device 200" according to one embodiment. The electronic device 200" illustrated in FIG. 2C is the same structure as the electronic device 200 illustrated in FIG. 2A. Specifically, the electronic device 200" depicted in FIG. 2C illustrates an non-illuminated state in which a portion of incoming external ambient light 240 is reflected by the light reflective material 218 to produce reflected ambient light 242. The reflected ambient light 242 can serve that provide a visual impression that the hole 206 is not present. In other words, when the light source 210 is inactive, the hole 206 is disguised whereby the user does not visually perceive the existence of the hole 206.

Figure 3:
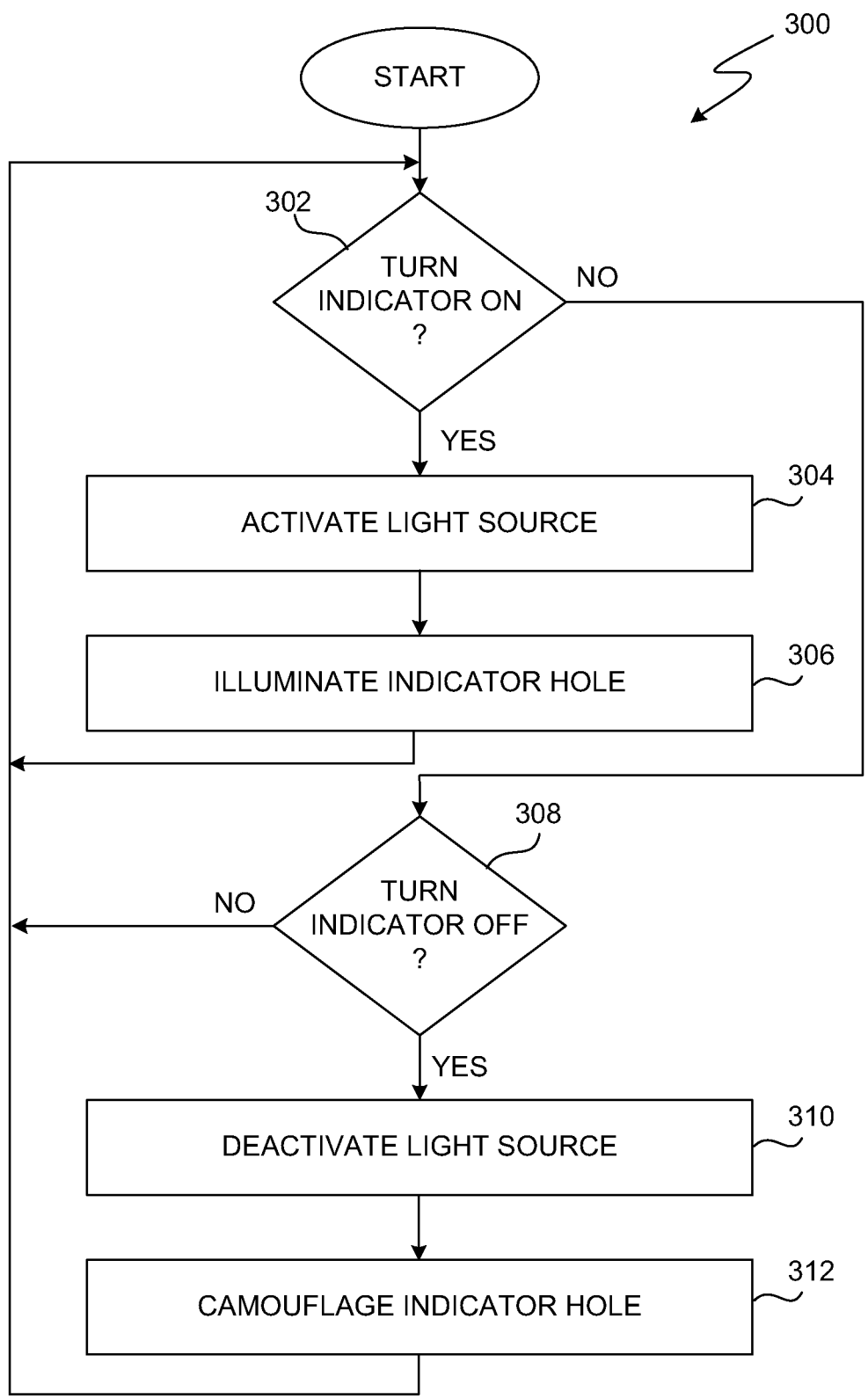
FIG. 3 is a housing indication process according to one embodiment.

FIG. 3 is a housing indication process 300 according to one embodiment. The housing indication process 300 can be performed by an electronic device, such as the portable electronic device 100 illustrated in FIG. 1 or the electronic device 200 illustrated in FIG. 2A.

The housing indication process 300 can begin with a decision 302 that determines whether an indicator is to be turned on. Here, the indicator can be associated with the electronic device and represent a status, alert, or other feedback to a user of the electronic device. In one embodiment, the indicator is provided by a combination of a light source (e.g., LED) and an opening in a housing for the electronic device. The opening can be referred to a hole or, more specifically, an indicator hole. When the decision 302 determines that the indicator is to be turned on, the light source can be activated 304. Typically, the light source is contained within the housing. Once the light source is activated 304, the indicator hole in the housing can be illuminated 306. In particular, the light produced by the light source (when activated) can exit the housing through the indicator hole and thereby provide a visual alert the user of the electronic device of a particular condition.

On the other hand, when the decision 302 determines that the indicator is not to be turned on, a decision 308 can determine whether the indicator is to be turned off. When the decision 308 determines that the indicator should be turned off, the light source can be deactivated 310. Consequently, with the light source deactivated 310, the indicator hole in the housing becomes camouflaged 312. As a result, although the indicator hole is physically present in the housing of the electronic device, the indicator hole is not visible or at least not clearly visible to a person while the light source is deactivated 310.

Following the block 306, the decision 308 (when the indicator is not be turned off), or the block 312, the housing indication process 300 can return to repeat the decision 302 and subsequent blocks so that the indicator can be continuously operated to illuminate if active or to camouflage if inactive.

Figure 4:
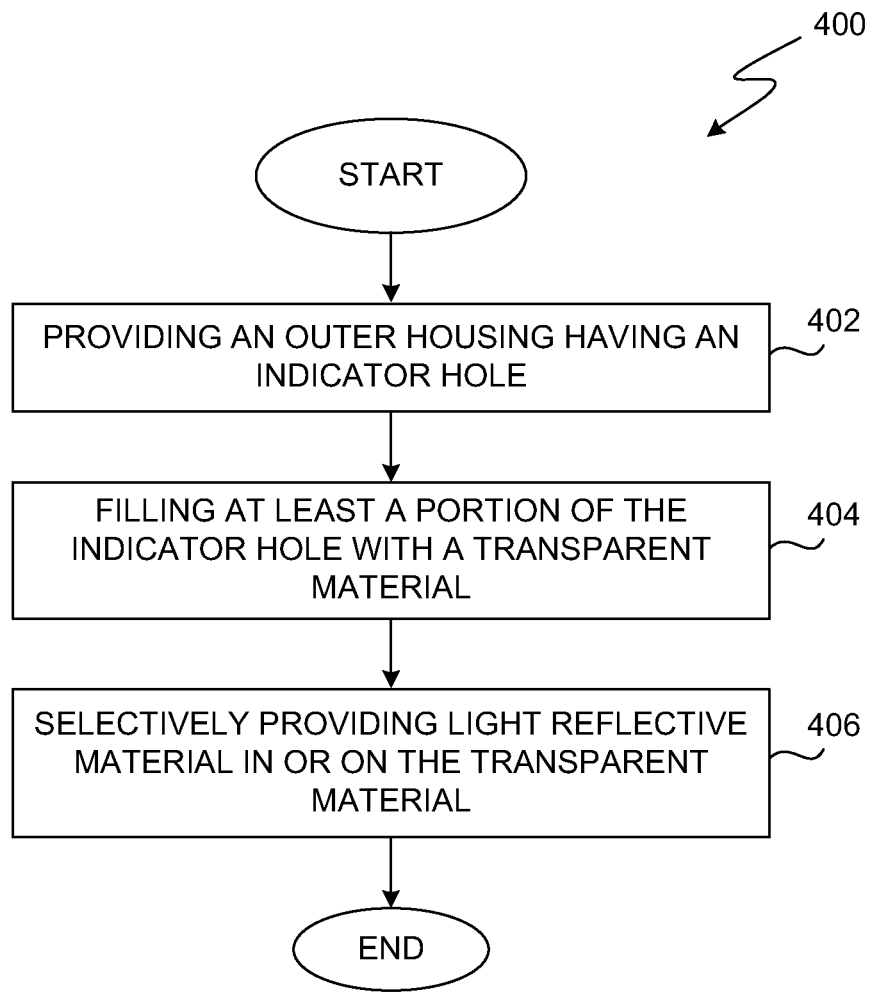
FIG. 4 is a flow diagram of a discreet hole formation process according to one embodiment.

FIG. 4 is a flow diagram of a discreet hole formation process 400 according to one embodiment. The discreet hole formation process 400 can be used to form one or more indicator holes in a housing for a consumer electronic device in a manner that makes the indicator hole discreet, that is, substantially imperceptible to a user's eye while inactivated.

The discreet hole formation process 400 can provide 402 an outer housing having an indicator hole. Here, the outer housing can refer to the exposed outer portion of the housing for the consumer electronic device, such as a portable electronic device. The outer housing can include at least one indicator hole that is utilized to alert a user of one or more conditions associated with the consumer electronic device.

Next, at least a portion of the indicator hole can be filled 404 with a transparent material. The transparent material does not have to be completely transparent but is generally clear or substantially transparent. For example, a polymer can be used as the transparent material. In one specific example, the polymer can pertain to a curable adhesive that is substantially transparent at least when cured.

After the at least a portion of the indicator hole has been filled 404 with the transparent material, light reflective material can be selectively provided 406 in or on the transparent material that is provided within the indicator hole. The light reflective material can pertain to ink (including paint) that can be substantially more reflective to light than the transparent material. By selectively providing the light reflective material, only a portion of the outer exposed surface area of the transparent material provided in the indicator hole is covered or includes the light reflective material. After the light reflective serial has been selectively provided 406, the discreet hole formation process 400 can end.

FIGS. 5A-5D illustrate cross-sectional diagrams of a portion of a housing being modified to form an indicator hole according to one embodiment.

Figure 5A:
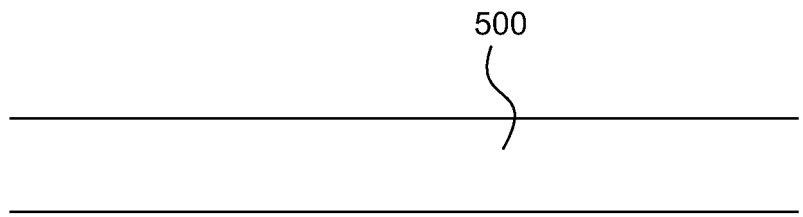
FIGS. 5A-5D illustrate cross-sectional diagrams of a portion of a housing being modified to form an indicator hole according to one embodiment.

FIG. 5A illustrates a housing member 500 being provided. The housing member 500 represents a portion of the housing for an electronic device. Typically, in the case of portable electronic device, the housing member is relatively thin, such as less than 5 mm thick or, more particularly, between 0.5-2 mm thick. The housing member 500 can be formed of an material suitable for a housing. Examples of suitable materials include metal (e.g., aluminum) or polymers (e.g., polycarbonate).

Figure 5B:
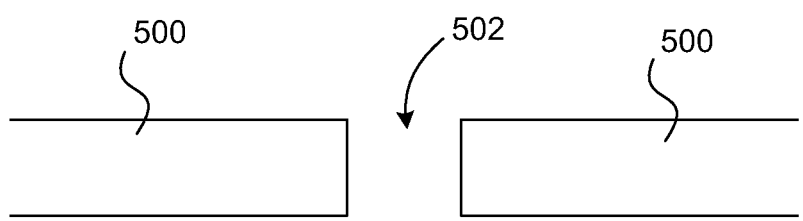

FIG. 5B illustrates the housing member 500 being processed to form a hole 502 through the housing member 500. The hole 502 is also relatively small, such as less than 3 mm diameter or, more particularly, about 1 mm diameter. The hole 502 can be formed by a laser or by drilling.

Figure 5C:
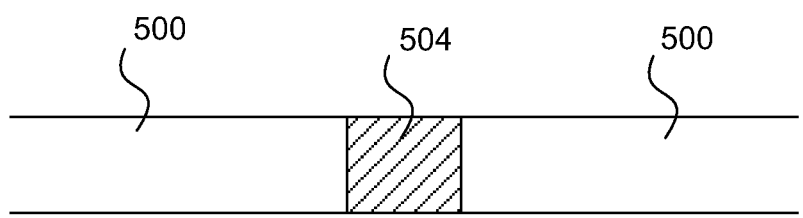

FIG. 5C illustrates the housing member 500 being processed to fill the hole 502 with a transparent material 504. The transparent material 504 can be a polymer that is in a liquid or gel form that can be inserted into the hole 502 and then solidified or cured. For example, the transparent material 504 can be a curable adhesive (e.g., UV curable adhesive) that can be inserted into the hole 502 and then cured, whereby when cured the adhesive is substantially transparent.

Figure 5D:
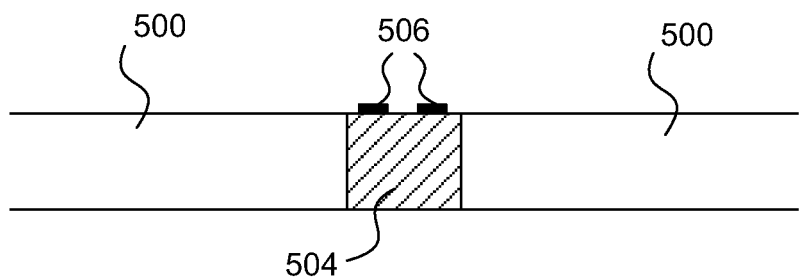

FIG. 5D illustrates the housing member 500 being further processed to apply light reflective material 506 to select portions on the outer surface of the transparent material 504. As one example, the light reflective material 506 can be an ink that is printed, sprayed or otherwise provided on the transparent material 504. As another example, the light reflective material 506 can be a metal that can be deposited (e.g., physical vapor deposition) on the transparent material 504.

FIGS. 6A-6D illustrate cross-sectional diagrams of a portion of a housing having light reflective characteristics being implemented at an indicator hole for an indicator according to several different embodiments.

Figure 6A:
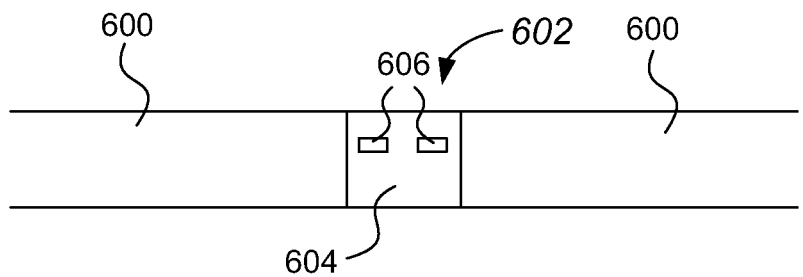
FIGS. 6A-6D illustrate cross-sectional diagrams of a portion of a housing having light reflective characteristics being implemented at an indicator hole for an indicator according to several different embodiments.

FIG. 6A illustrates a housing member 600 having a hole 602 extending through the depth of the housing member 600. Within the hole 602 is a transparent material 604 that serves to fill or seal the hole 602. Additionally, to provide the light reflection needed to disguise (or camouflage) the hole 602 when not in use, light reflective material 606 can be provided at selective portions within the transparent material 604.

Figure 6B:
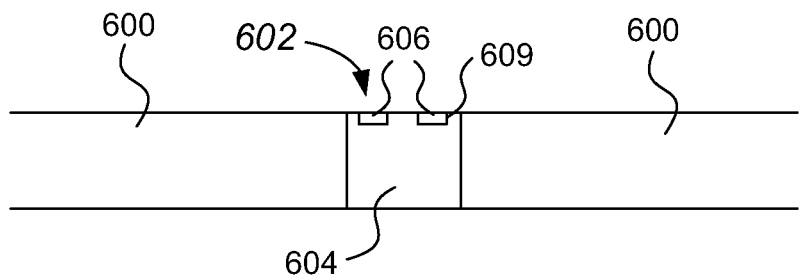

FIG. 6B illustrates the housing member 600 having the hole 602 extending through the depth of the housing member 600. Within the hole 602 is a transparent material 604 that serves to fill or seal the hole 602. Additionally, to provide the light reflection needed to disguise (or camouflage) the hole 602 when not in use, light reflective material 608 can be provided at selective portions within recesses 609 provided on the surface of the transparent material 604. For example, the recesses 609 can be etched, laser formed, cut, or molded. The recesses 609 provide a tiny reservoirs into which the light reflection material 808 (e.g., ink) can be placed.

Figure 6C:
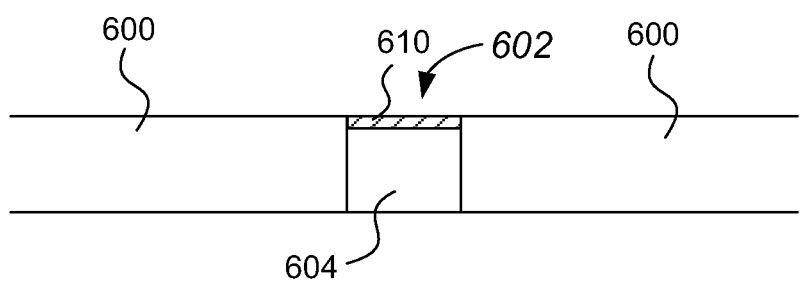

FIG. 6C illustrates the housing member 600 having the hole 602 extending through the depth of the housing member 600. Within the hole 602 is a transparent material 604 that serves to fill or seal the hole 602. Additionally, to provide the light reflection needed to disguise (or camouflage) the hole 602 when not in use, light reflective material 610 can be provided as a layer of material provided over the transparent material 604. The layer of material 610 is partially light reflective and partially light transmissive so that some incident external light can be reflected so as to disguise the hole 602 when the indicator is not in use, while not overly impeding light from emitting from the hole 602 when the indicator is in use.

Figure 6D:
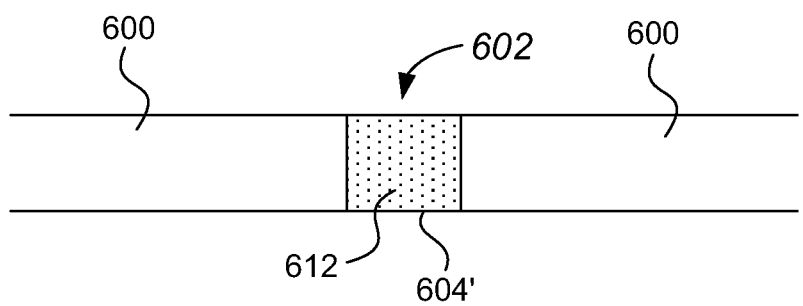

FIG. 6D illustrates the housing member 600 having the hole 602 extending through the depth of the housing member 600. Within the hole 602 is a semi-transparent material 604' that serves to fill or seal the hole 602. However, in this embodiment, the semi-transparent material 604' includes light reflection material 612 dispersed therein. The light reflection material 612 serves to provided the light reflection needed to disguise (or camouflage) the hole 602 when not in use.

Figure 7:
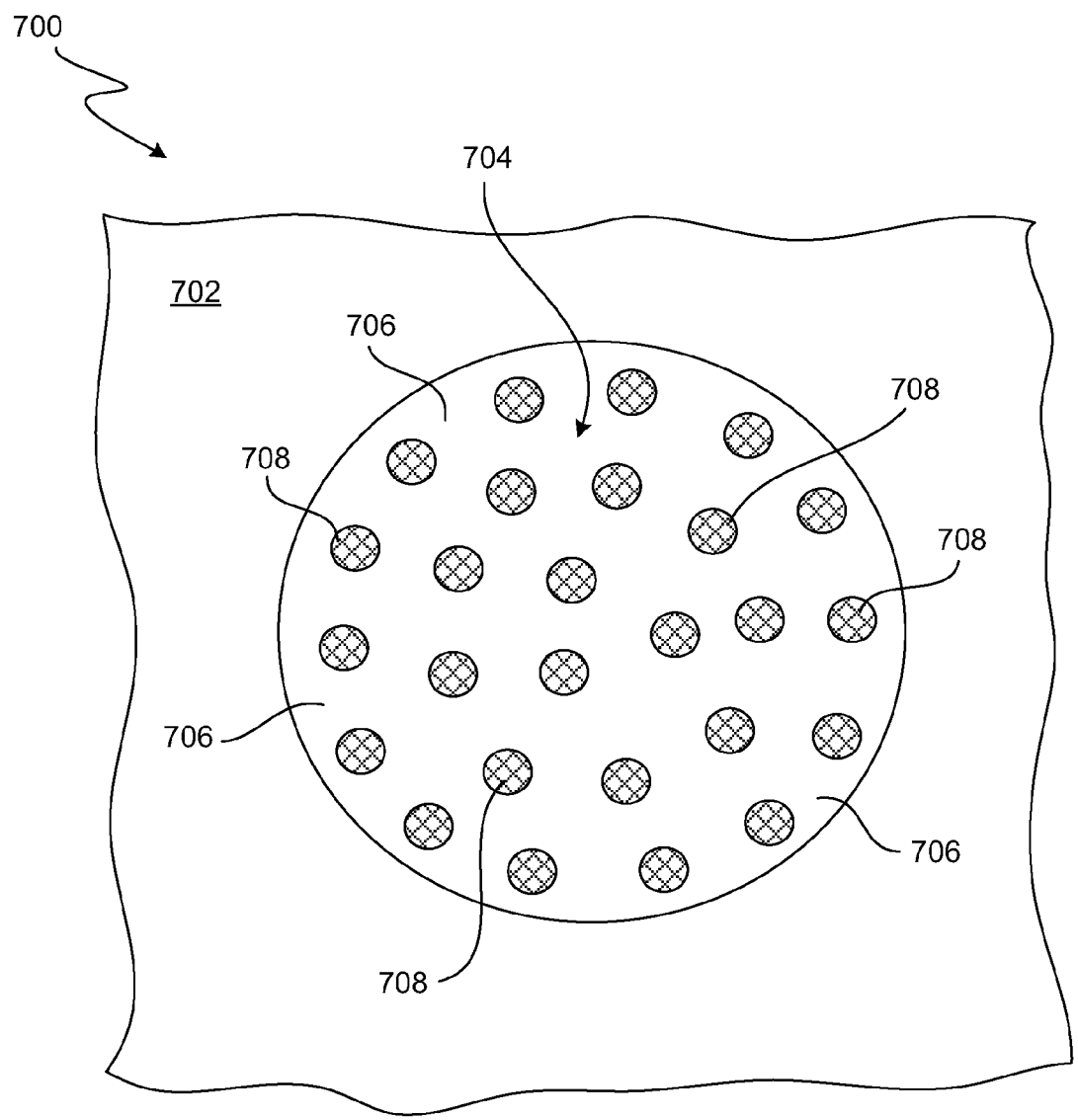
FIG. 7 illustrates a top view of a portion of a housing according to one embodiment.

FIG. 7 illustrates a top view of a portion of a housing 700 according to one embodiment. The housing 700 includes a housing surface 702 that includes a hole 704. The hole 704 is filled with a filler 706. The filler 706 is substantially transparent so that light can pass therethrough without substantial loss. Additionally, reflective elements 708 are provided on or in the filler 706. The reflective elements 708 serve to reflect external incident light so that the hole 704 appears to a person to no be present. In other words, the reflective elements 708 disguise (or camouflage) the hole 704. The number, size, shape and spacing of the reflective elements 708 can vary widely with implementation. Through use of inks in one or more colors and in one or more layers, there is a great deal of flexibility for the visual appearance of the hole 704 to appear any color. Hence, the visual appearance of the hole 704 (when the light indication is inactive) can take on any desired color.

The techniques and apparatus describe herein may be applied to housings used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones, smart phones), PDAs, remote controls, netbooks, notebooks, tablet PCs, gaming controllers, monitors, all in one computers and the like.

The various aspects, features, embodiments or implementations of the invention described above can be used alone or in various combinations.

Although only a few embodiments of the invention have been described, it should be understood that the invention may be embodied in many other specific forms without departing from the spirit or the scope of the present invention. By way of example, the steps associated with the methods of the invention may vary widely. Steps may be added, removed, altered, combined, and reordered without departing from the spirit of the scope of the invention. Similarly, while operations are depicted in the drawings in a particular order, this should not be understood as requiring that such operations be performed in the particular order shown or in sequential order, or that all illustrated operations be performed, to achieve desirable results.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An electronic device, comprising:
   a housing having an outer exposed surface with at least one hole extending therethrough, the housing at least partially covering an inner region;
   a light source provided within the inner region and proximate to the at least one hole;
   a light transmissive filler provided in the hole; and
   light reflective material selectively and partially provided in or on the light transmissive filler.

2. An electronic device as recited in claim 1, wherein the light transmissive is a polymer filler, and wherein the polymer filler is substantially transparent.

3. An electronic device as recited in claim 2, wherein the polymer filler comprises a curable adhesive.

4. An electronic device as recited in claim 1, wherein the light reflective material comprises ink.

5. An electronic device as recited in claim 1, wherein the light reflective material comprises a plurality of layers of ink.

6. An electronic device as recited in claim 1, wherein the light reflective material comprises a plurality of micro dots of ink.

7. An electronic device as recited in claim 1, wherein the at least one hole has a diameter less than 3 millimeters.

8. An electronic device as recited in claim 1, wherein the electronic device is a handheld electronic device.

9. An electronic device as recited in claim 1, wherein the electronic device comprises:
   a controller operatively coupled to the light source to control when the light source emits light.

10. An electronic device as recited in claim 1, wherein the light reflective material serves to reflect external light such that to an observer viewing the hole, the hole is substantially camouflaged relative to nearby portions of the outer exposed surface.

11. An electronic device as recited in claim 10, wherein the light transmissive filler comprises a transparent material, and wherein the transparent material comprises a polymer.

12. An electronic device as recited in claim 11, wherein the polymer comprises a curable adhesive that is substantially transparent at least when cured.

13. An electronic device as recited in claim 11, wherein the polymer is substantially transparent.

14. An electronic device as recited in claim 10, wherein the light reflective material comprises ink.

15. An electronic device as recited in claim 10, wherein the light reflective material is selectively provided by printing micro dots of ink in or on the light transmissive filler provided in the hole.

16. An electronic device as recited in claim 10, wherein the light reflective material is selectively provided by printing micro dots of ink on the light transmissive filler provided in the hole.

17. An electronic device as recited in claim 10, wherein the light reflective material is selectively provided by depositing at least one layer of ink at select portions in or on the light transmissive filler provided in the hole.

18. An electronic device as recited in claim 10, wherein the selectively providing comprises:
depositing at least one layer of ink at select portions on the light transmissive filler provided in the hole.

19. A consumer electronic device, comprising:
a housing having an outer exposed surface with at least one hole extending therethrough, the housing at least partially covering an inner region;
a light source provided within the inner region and proximate to the at least one hole;
a controller provided within the inner region and operatively coupled to the light source to control when the light source emits light;
a polymer filler provided in the hole; and
ink selectively provided in or on the polymer filler, wherein the ink is only partially in or on the polymer filler.

20. A consumer electronic device as recited in claim 19, wherein the polymer filler is substantially transparent, and wherein the ink is substantially opaque.

21. A consumer electronic device as recited in claim 19, wherein the ink serves to reflect external light such that to an observer viewing the at least one hole, the at least one hole is substantially camouflaged relative to nearby portions of the outer exposed surface.

22. A consumer electronic device as recited in claim 19, wherein the at least one hole has a diameter less than 3 millimeters.

23. An electronic device as recited in claim 1, wherein the outer exposed surface of the housing adjacent the hole is substantially flush with a top surface of the polymer filler with the ink material.

24. An electronic device as recited in claim 1, wherein the outer exposed surface of the housing adjacent the hole is substantially flush with a top surface of the light transmissive filler with the light reflective material.

* * * * *